(12) United States Patent
Bates et al.

(10) Patent No.: US 6,356,401 B1
(45) Date of Patent: Mar. 12, 2002

(54) METHOD AND APPARATUS FOR FORMING ACCURATE OPTICAL CLOCK PATTERNS

(75) Inventors: Charles A. Bates, Saratoga; Lawrence M. Bryant, Palo Alto; David S. Kuo, Castro Valley; Eric G. Rawson, Saratoga, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/120,707

(22) Filed: Jul. 22, 1998

Related U.S. Application Data

(60) Provisional application No. 60/053,439, filed on Jul. 22, 1997.

(51) Int. Cl.$^7$ .............................. G11B 5/09; G11B 21/02
(52) U.S. Cl. ........................................... 360/51; 360/75
(58) Field of Search ............................. 360/51, 75, 135; 369/52, 53, 54

(56) References Cited

U.S. PATENT DOCUMENTS

| | | | | |
|---|---|---|---|---|
| 4,816,939 A | * | 3/1989 | Ford et al. | 360/77.03 |
| 4,896,228 A | * | 1/1990 | Amakasu et al. | 360/77.05 X |
| 5,268,801 A | * | 12/1993 | Hazel et al. | 360/77.03 |
| 5,322,987 A | * | 6/1994 | Thomas et al. | 360/135 X |
| 5,339,204 A | * | 8/1994 | James et al. | 360/77.03 X |
| 5,442,172 A | | 8/1995 | Chiang et al. | |
| 5,473,480 A | * | 12/1995 | Ishids et al. | 360/51 |
| 5,553,086 A | * | 9/1996 | Sompel et al. | 360/75 X |
| 5,909,333 A | * | 6/1999 | Best et al. | 360/51 |
| 5,963,391 A | * | 10/1999 | Nakagawa et al. | 360/51 X |
| 5,991,112 A | * | 11/1999 | Song et al. | 360/75 |
| 6,009,063 A | * | 12/1999 | Nguyen et al. | 360/77.03 X |

FOREIGN PATENT DOCUMENTS

| | | | | |
|---|---|---|---|---|
| JP | | 5-303852 | * 11/1993 | 360/75 |

* cited by examiner

Primary Examiner—Andrew L. Sniezek
(74) Attorney, Agent, or Firm—Derek J. Berger; JOnathan E. Olson; Shawn B. Dempster

(57) ABSTRACT

The present invention is used to form precise, optically detectable patterns on rotating members of a disk and spindle assembly of a disk drive used in data storage system. In particular, the invention employs an optical source to form optically detectable patterns on the rotating members of the disk drive. These optically detectable patterns are used to create an accurate clock track. The clock track may be used to create multiple accurate magnetic patterns on one or more disks attached to a disk and spindle assembly in a magnetic data storage system. By successively changing the radius at which the magnetic patterns are created it is then possible to create multiple magnetic patterns at successive radii with all such magnetic patterns having a precise geometric relationship to each other. Alternatively, the accurate clock pattern may stand alone as an encoder. Additionally, the present invention may also be used to form textured surfaces on a disk to control the flying characteristics of a magnetic head slider assembly. The present invention can also create textured surfaces which will serve as a resting area for the magnetic head slider assembly of a magnetic disk drive when the disk is not spinning.

18 Claims, 7 Drawing Sheets

METHOD AND APPARATUS FOR FORMING ACCURATE OPTICAL CLOCK PATTERNS

RELATED APPLICATIONS

This invention is related to the concurrently filed and copending Patent Application, filed on Jul. 22, 1998, entitled "Method and Apparatus for Optically Sensing Accurate Clock Patterns", which concerns a method of sensing the patterns formed by the present invention. This invention also derives from and claims priority to Provisional Application Serial No. 60/053,439, filed on Jul. 22, 1997.

FIELD OF INVENTION

This invention relates to a method and apparatus for servowriting the disks of a disk drive, in particular, a magnetic disk drive. More particularly, the method and apparatus can be used to form optically detectable patterns using code wheels and sensors. The patterns may be formed on any rotating surface of the head-disk assembly, thereby eliminating the need to servowrite in a contamination controlled environment, and eliminating the need for a servowriter clock head assembly.

BACKGROUND OF THE INVENTION

In the present art of manufacturing rotating disk magnetic data storage devices, referred to as disk drives, it is necessary to place accurate magnetic patterns, referred to as servo patterns, on the surface of one or more disks in the disk drive. These servo patterns are used during normal operation of the disk drive as position reference points in order to place the magnetic read and write heads of the disk drive at any particular radius of any disk so that data may be written to or read from the magnetically alterable surface of the disk. Typically these patterns also contain information describing the angular position of the disk as well as the radius so that magnetic data may be written to, or read from, precise geometrically defined areas of any disk in the disk drive. Ordinarily, these patterns are written on one or more of the disk surfaces in a disk drive by a machine referred as a servowriter. In order to write the accurate magnetic patterns on the disk, the servowriter uses an accurate clock signal as a reference for the placement of these patterns. The accurate clock signal must maintain a precise geometric relationship with the rotating disk assembly while the servo patterns are being formed. In order to attain the necessary precision, it is a present practice to form the accurate clock on the surface of at least one of the disks in the disk drive. This accurate clock is typically formed by using a separate magnetic head assembly, commonly referred to as a clock head assembly, which is part of the servowriter. During clock pattern formation, the clock head assembly is typically moved to the outer radius of at least one of the disks in the disk drive. At this radial position the clock head assembly forms a magnetic clock pattern on at least one of the disks in the disk drive. After this clock pattern is formed, it is then sensed by the same clock head assembly or another clock head assembly for use as an accurate reference clock for forming servo patterns on the surface of one or more of the disks in the disk drive.

The present art for most disk drives requires that the disk and spindle assembly be kept very clean and free of contamination. Otherwise, the surface of the disks may be physically damaged, destroying the data storage capability of the disks. To prevent this contamination, the disk and spindle assembly of the disk drive is placed in a sealed enclosure during normal use. However, in order to use the clock head assembly to form and sense the accurate reference clock, an opening must be made in the sealed enclosure. Unfortunately, this opening permits contamination to enter the otherwise sealed disk and spindle assembly enclosure. Moreover, the clock head assembly itself may become contaminated and thereby transfer contamination through the opening and into the enclosure when it is moved into place near the disks. To reduce the risk of damage resulting from such contamination, the accurate clock pattern and the servo patterns are typically placed onto the disks in a contamination-controlled environment such as in a clean room or underneath a flow-hood. To further reduce contamination, the magnetic heads of the clock head assembly are regularly changed. The cost of buying and maintaining clean rooms is substantial, as is the cost of suitable flow hoods. The cost of replacement magnetic heads for the clock head assembly is also substantial.

Accordingly, there is a need for a method and apparatus for forming accurate clock patterns on the surfaces of a rotating member of a disk drive that can be read from outside of a sealed enclosure.

SUMMARY OF THE INVENTION

The present invention provides a method and apparatus for forming accurate, optically detectable, clock patterns on the surfaces of rotating members of a disk drive. This optically detectable, accurate clock pattern, allows the replacement of the magnetic clock head assembly of a servowriter with an optical system featuring an optical sensor which detects an optically detectable pattern on the surface of one of the magnetic disks or, for that matter, on the surface of any of the rotating members of the disk and spindle assembly of a disk drive. This optically detectable clock pattern is formed by optical light pulses, which are focused on one or more of the aforementioned surfaces. This clock pattern formation is typically done in the disk drive manufacturing process by the present invention which is designed for forming optically detectable clock patterns. This present invention may also be advantageously used to form textured surface patterns on the disk surface, which will later be used to control the flying height of a head which flies over the disk. Additionally, the present invention may be advantageously employed to form a textured surface pattern on a disk surface in order to control the friction characteristics between a head and disk when the head comes into contact with the disk.

An optical sensor is later used to sense the clock pattern and form an accurate clock. This accurate clock is then used to form servo patterns on one or more of the disks in a disk drive. Typically, the optical sensor remains outside of the disk and spindle enclosure of the disk drive and senses the optically detectable pattern by passing a light beam through an opening in the disk and spindle enclosure of the disk drive. By reading the clock pattern from outside the sealed enclosure the risk of damage from contamination is greatly reduced. As a result, the use of clean rooms and flow hoods becomes unnecessary for the formation of servo patterns on the disks of a disk drive. The monetary cost of buying and maintaining clean rooms and flow hoods and replacing magnetic heads for the servowriter clock head assembly can be reduced or eliminated.

BRIEF DESCRIPTION OF THE DRAWINGS

The reference numbers used in the drawings refer to the same component throughout, the specification.

DETAILED DESCRIPTION OF THE INVENTION

Figure 1:
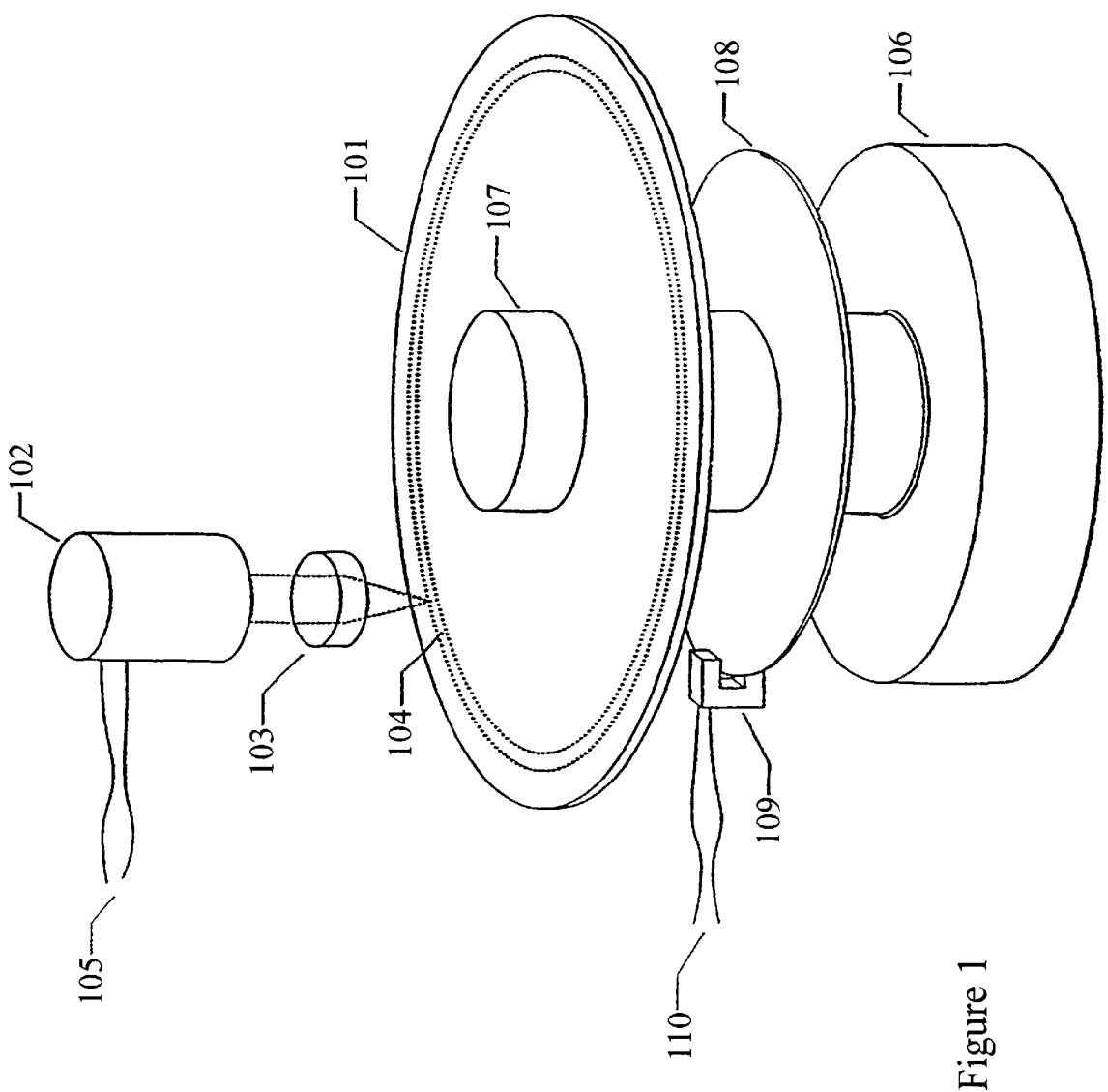
FIG. 1 is an exploded perspective view of one embodiment of the present invention.

FIG. 1 illustrates one embodiment of a system for forming an optically detectable pattern on a rotating member of a magnetic disk drive, in this case a disk, by using an optical source such as a laser. Although the optically detectable pattern is formed on a disk in FIG. 1, it would be within the scope of the present invention to form the optically detectable pattern on any rotating member of the spindle and disk assembly of a disk drive. The disk drive disk 101 is used to store computer information. Typically, such disks magnetically store computer information and have a magnetically alterable surface. The magnetically alterable surface may be formed, either before or after, the optically detectable clock pattern 104 is formed. Typically, disk 101 is composed of a glass, metal, or plastic substrate with several layers of other materials applied to the surface of the substrate. At least one layer of the materials applied to the surface of disk 101 is a magnetically alterable material on which magnetic patterns will be stored.

Figure 3:
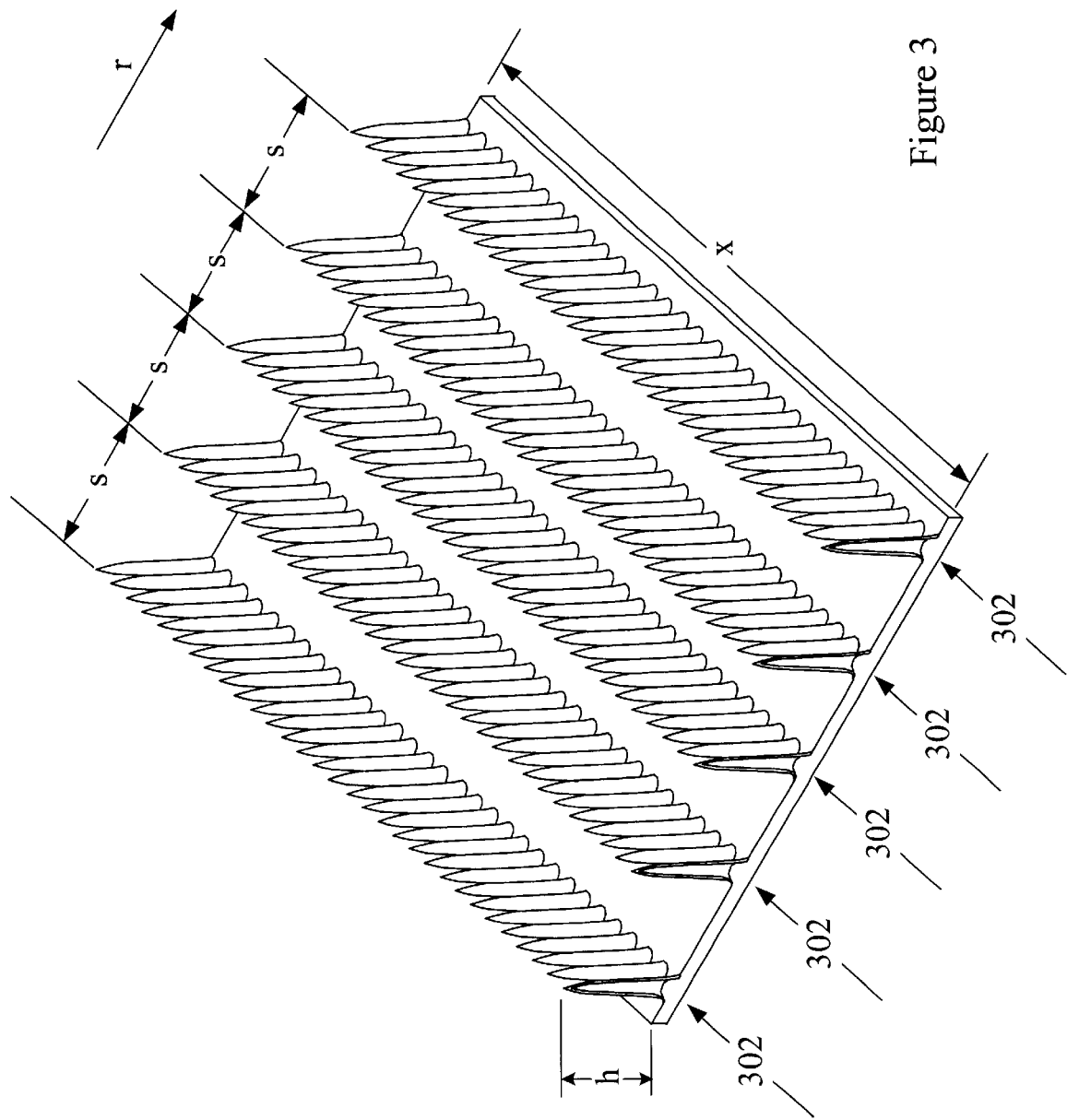
FIG. 3 is a magnified perspective view of a portion of an optically detectable pattern on disk as in FIG. 1.

The present invention creates optical clock patterns by focusing the output of the optical source 102 onto the surface of a disk 101 using an objective lens 103. The optical source 102 is controlled by an electrical signal passed through wires 105. The optical source itself may be an electrically modulated laser such as a semiconductor laser or a gas discharge laser or a continuous laser which feeds its optical output through a separate modulator such as an electro-optic or acousto-optic modulator. Although the pictured embodiment uses a laser system 102, the invention may be practiced using any optical system which emits optical output pulses in response to an electrical signal and has an optical wavelength and power output capable of forming an optically detectable pattern on a disk 101. Such systems are known and understood to those with ordinary skill in the art. One embodiment mounts a laser system 102 and objective lens 103 on a positioning system (not shown) for focusing the laser optical output on disk 101 at any desired radial distance from the center of disk. An optically detectable pattern 104 is formed at a specific radius using the laser. It should be noted that the optically detectable pattern might take a variety of forms. For example, the pattern may consist of "bumps" in endless variety of specific shapes (e.g. craters, double-rimmed craters, cones, domes, etc.). Furthermore, the invention may incorporate pattern variations in color, shape, size, density, conformation, frequency, etc. The key criteria are that the patterns are readable or detectable using an optical sensor. The preferred embodiment uses patterns of laser formed physical deformations in the disk surface. An example of such a pattern is depicted in FIG. 3.

The clock pattern is formed by the present invention which temporarily attaches a disk 101 to a high precision spindle 107 which is attached to a high precision motor 106. By using the motor 106 to rotate the high precision spindle 107 and focusing the optical output from the optical source 102 onto the disk surface 101, a highly accurate circular pattern 104 of optically detectable features is formed on the surface of disk 101. This optically detectable pattern 104 may be formed at any chosen radius. Optionally, a code wheel 108 containing an optical or magnetic pattern can be used as a reference pattern for forming the optically detectable pattern 104 on the disk surface 101. Associated with the code wheel 108 is a sensor 109 for detecting the pattern on code wheel 108 and producing a signal (on wires 110). This resulting "sensor signal" operates and, once processed through an optical pattern generator, controls the optical source. In this way, the sensor signal controls the optical source which creates the clock pattern on the disk 101 surface. It can readily be appreciated that the optical source may be controlled by means other than a code wheel. For instance, data stored on a "floppy" disk or "hard drive" or even a specialty "plug-in" computer card may serve just as well.

The accurate clock pattern may be formed on rotating members within a disk drive, as will now be described. A magnetic disk drive is provided having a disk and spindle assembly. Rotatable members are provided on the disk and spindle assembly, which has one or more rotatable data storage disks. Magnetic transducer heads are also provided for reading or writing data on the disks, and they are mounted within a substantially sealed enclosure along with the rotatable members and disk and spindle assembly. A precision motor assembly may be provided for rotating the rotatable members or data storage disks. The enclosure includes an opening therein. An optical system is provided external to the enclosure. The optical system is used to generate an optical beam which is directed through the opening in the enclosure. This optical beam is of sufficient intensity to create optically detectable features on a surface of one of the rotatable members, and such features are thereby formed on the surface. The optical beam may also be used to form a textured surface on at least one of the data storage disks.

The optical beam may be comprised of laser light, such that the optically detectable features on the surface take the form of patterns of laser formed physical surface deformations, which function to reduce errors in the accurate clock pattern by virtue of their size and placement. The laser light may take the form of a laser beam comprised of optical pulses controlled with a controller electrical signal. A code wheel may be mechanically attached to the precision motor assembly. A sensor may be used to sense a pattern on the code wheel, and this sensed pattern may then be converted into the controller electrical signal.

In addition to the advantages described above, the optical system provides another unique advantage. The present invention has the ability to form physical deformations on the surface of disk 101 for purposes other than clock formation. Such physical deformations of the disk surface may be used to control the flying height of a magnetic head slider over the surface of disk 101. Physical deformation of the disk surface may also be advantageously used to form textured regions of a disk surface 101 where a magnetic head slider may come to rest when the disk is not spinning. This is significant because the smooth surfaces of the magnetic storage disks are prone to binding with the magnetic head sliders (See, 407 of FIG. 4) when disk rotation ceases and the magnetic head sliders come to rest on the disk surface 101. This surface binding makes restarts difficult and potentially damaging to the disk and head slider. To prevent this from occurring, the present invention forms physical deformations in the surface of the disk 101. These deformations serve as suitable surfaces for the magnetic head slider to rest on when the disk is not rotating. This helps prevent the disk/head-binding problem and eases restarts thereby reducing disk drive failures.

Figure 2:
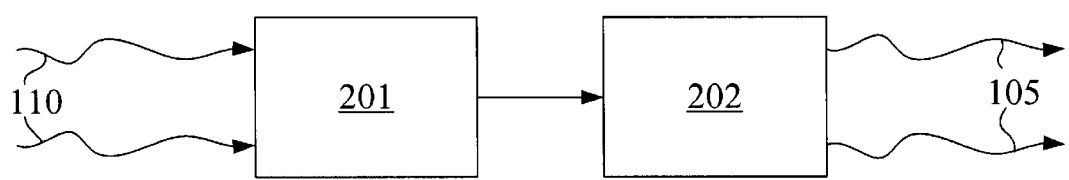
FIG. 2 illustrates a block diagram of an electronic system used with the apparatus of FIG. 1.

Referring to FIG. 2, code wheel detector 201 accepts the controller signal from the code wheel sensor 109 (on wires 110) and converts the signal into a logic level signal which is then carried into optical pattern generator 202. The code wheel signal (on wires 110) may be a continuously varying analog signal or a logic level signal. Code wheel detector 201 may contain signal-processing circuitry to convert the signal into a logic level signal if the code wheel sensor signal is not already a logic level signal. Code wheel detector 201 may also contain electronic filters for reducing extraneous noise contained in the code wheel sensor signal (on wires 110). The optical pattern generator 202, need only be a circuit capable of accepting a logic level signal from code wheel detector 201 and capable of producing signals suitable for controlling the optical source 102.

The optical pattern generator 202, optionally contains a phase locked loop (PLL) circuit. This PLL is constructed such that the frequency and/or phase of the signal emitted by the optical pattern generator (on wires 105) are precisely related to the frequency and/or phase, or both, of the code wheel signal (on wires 110). The PLL circuit of the optical pattern generator 202 may also contain an input divider circuit and a feedback divider circuit. The PLL input divider may be constructed to divide by any integer from 1 to N while the PLL feedback divider may divide by any integer from 1 to M. This constrains the frequency of the signal on wires 105 to the frequency of the code wheel signal on wires 110 multiplied by the ratio M divided by N. Therefore, the PLL circuit of the pattern generator 202 enables the optical source control signal (on wires 105) to conform to one of many different frequencies with each frequency precisely related in frequency or phase, or both, to the code wheel signal (on wires 110). In addition, by constraining the operating bandwidth of the PLL contained in pattern generator 202, extraneous noise contained in the code wheel signal (on wires 110) is significantly reduced, thereby increasing the precision of the signal (on wires 105) and the precision of formation of the optically detectable pattern on disk 101. For example, by constraining the PLL to a frequency of 5-kilohertz (kHz), noise components above 5 kHz, which may be present in the code wheel signal, will be reduced. Other PLL bandwidths may also be chosen in order to optimize precise formation of the optically detectable pattern on a disk 101, depending upon the characteristics of the code wheel signal (on wires 110) and the dynamics of the spinning disk 101.

FIG. 3 depicts a small portion of one example of a pattern formed by one application of the pattern forming apparatus of FIG. 1 in conjunction with the pattern forming electronic system of FIG. 2. Each semi-conical raised "bump" 301 shown in FIG. 3 is an optically detectable feature (i.e. a physical deformation) formed by the reaction of the disk 101 surface to the optical energy of an individual optical output pulse from the optical source 102. If disk 101 is rotated in direction ("r") another such physical deformation can be created at a location which has ("S") angular distance from the first. If disk 101 is rotated through a complete revolution, a series of such physical deformations can be created around the entire radial circumference at a first radius of the disk. If, after one revolution of disk 101, the optical source 102 or objective lens 103 or both are moved to a second radius and the disk is rotated through a second revolution, a second series of physical deformations can be formed at this second radius of the disk. By using the apparatus of FIGS. 1 and 2, each physical deformation 301 at this second radius can be formed at an angular position, which is very closely coincident with a physical deformation formed at the first radius. Similarly, a third such series of physical deformations can be formed at a third radius, and so forth, until a number of series of deformations are formed at a number of radii. The formation of a series of physical deformations can also be performed by the pattern forming system of the present invention by continuously rotating disk 101 while also continuously moving the optical source 102 or objective lens 103 or both from some first radius to some second radius creating a spiral pattern composed of equally spaced physical deformations which lie along a set of specific angular positions around a rotation of the disk and also lie along a set of equally spaced radii of the disk. Therefore, each row of such optically detectable physical deformations (as depicted by 302 of the exemplar of FIG. 3) from lower left to upper right lies along a radius line projected from the center of disk rotation and are created by rotating the disk 101 on a spindle 107 with motor 106 while forming such optically detectable features around an entire revolution of the rotating disk 101 with the optical source 102 which is controlled by the pattern forming electronics of FIG. 2 and while simultaneously moving the optical source 102 and objective lens 103 from a first radius of disk 101 toward a second radius of disk 101.

The exemplar of FIG. 3, shows the height ("h") dimensions of the optically formed features 301. Typically, the individual features 310 are formed at a single predominate height which may vary from as little as 50 nanometers ("nm") to as high as 5000 nm. The pattern forming apparatus is capable of forming features throughout this range of heights. The row to row spacing ("S") of each row of formed features lying along each radius line 302, from lower left to upper right, in the figure, corresponds to an equal angle and an integer number of these rows are formed around a revolution of the disk. It must be noted that, although the rows 302 of FIG. 3 appear parallel, the row spacing S is an angular distance and each radius line 302 converges with the others at the center of the disk. Each disk may feature as few as 50 rows, where S is one fiftieth of a revolution, or as many as one million, where S is one millionth of a revolution. It should be noted that the present invention is not limited to the feature size and shape shown in FIG. 3 and that the height, shape and spacing of the optically detectable features can be controlled over a wide range by the pattern forming system of the present invention. Therefore, FIG. 3 represents only one of a multitude of possible patterns, which may be suitable as an optically detectable pattern 104. The radial width ("x") of each row 302 may be chosen so that a plurality of individual features 301 in each row 302 are simultaneously sensed by an optical sensor such as sensor 401 which will thereby further reduce errors caused by possible imprecision in the formation of individual features by averaging across a number of such features. This plurality of features 301 in each row 302 may be as few as three or as many as a few thousand in order to obtain such error reduction by sensing the average position of features in a row. After an optically detectable pattern 104 is formed in the above described manner the disk 101 may undergo further processing in order to produce a disk which is suitable for use in a data storage disk drive system. As long as optically detectable pattern 104 retains the needed characteristics to be optically detectable such manufacturing processing would be within the scope of the present invention. These criteria of retaining detectability after further processing would also apply if the optically detectable pattern were formed on any other rotating member of a disk drive spindle and disk assembly (for example, a spindle hub).

Figure 4:
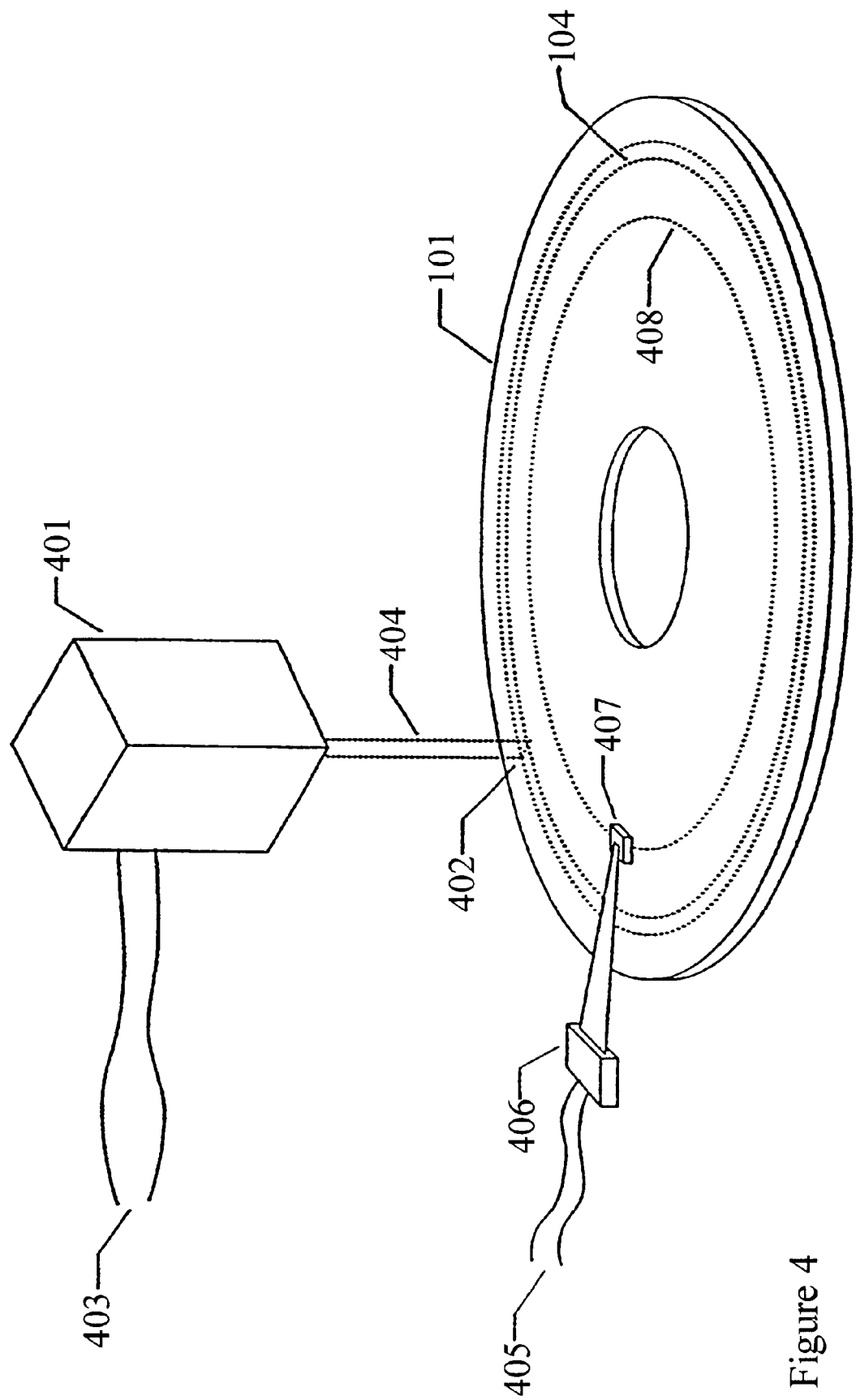
FIG. 4 is a perspective view of one embodiment of an apparatus for sensing an optically detectable pattern such as that shown in FIG. 3.
Figure 6:
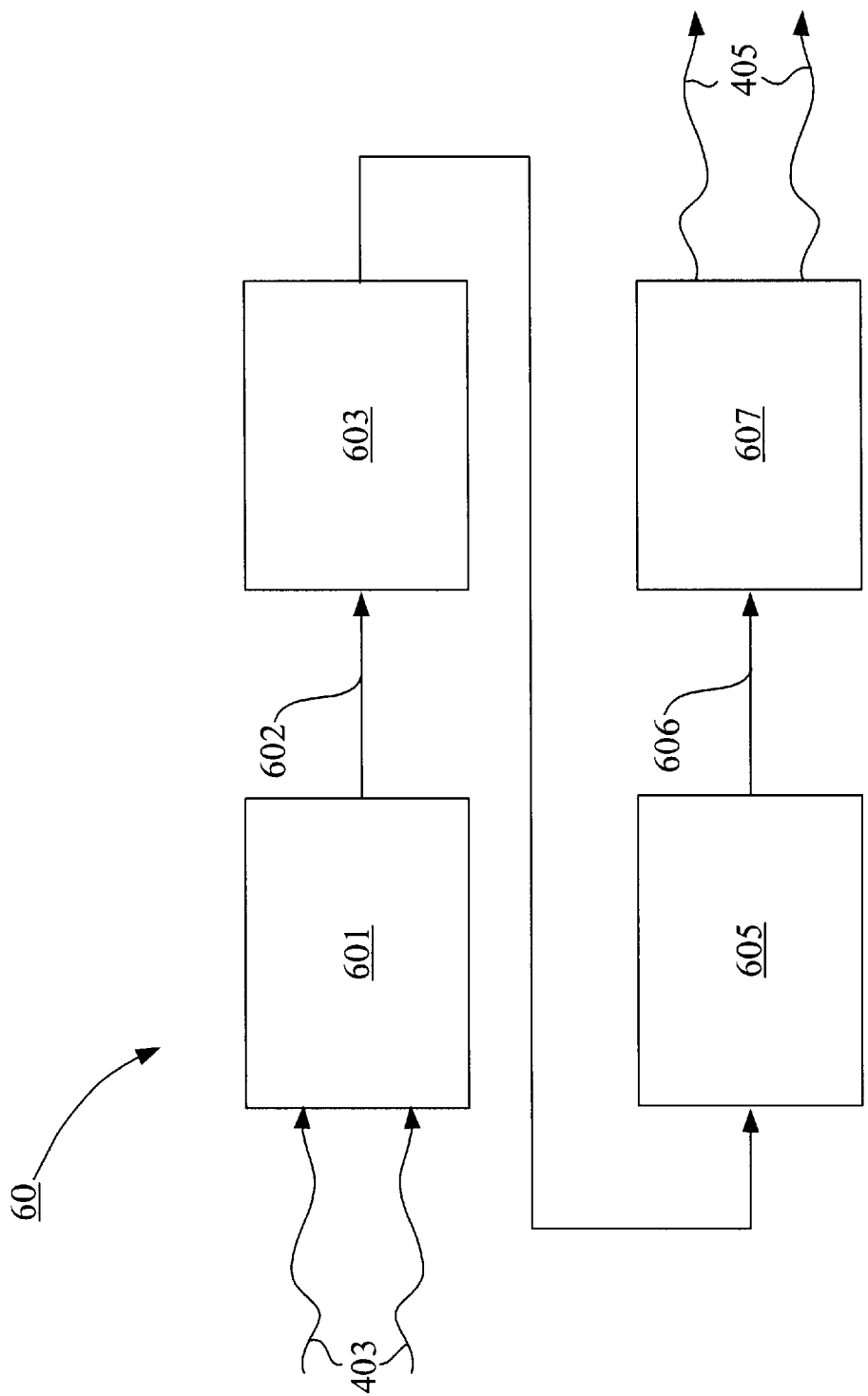
FIG. 6 is a block diagram of an electronic system used with the pattern sensing apparatus of FIG. 4.

Once created, the optically detectable pattern may be sensed by a variety of apparatuses. FIG. 4 illustrates an apparatus for sensing an optically detectable pattern 104 formed on disk 101 and then converting the sensed pattern into an electrical signal. Although FIG. 4 depicts an optically detectable pattern which is located on a disk, it would be within the scope of the present invention to form the optically detectable pattern on any rotating member of the spindle and disk assembly of a magnetic disk drive. The optical system 401 projects an optical beam 402 on the optically detectable pattern 104 to create an image. This image is reflected back into a photodetector contained within optical system 401, where it is converted into an electrical signal. The optical image created by the optical system 401 is suitably sized and shaped so that an appropriate amount of optical energy is either reflected directly back from disk 101 into optical system 401, or is deflected away from the optical system 401 by the shape of optically detectable pattern 104. Wires 403 carry the electrical signal created by the photodetector of the optical system 401 to a pattern detector/clock generating circuit (such a circuit is depicted in FIG. 6). The focal length of optical image path 404 and reflected optical return path 404 of optical system 401 are both designed to be sufficiently long to accommodate some amount of motion of disk 101 away from or toward optical system 401 without causing any degradation in the resulting electrical signal generated by the photodetector of the optical system. Disk 101 is mounted on the spindle (not shown) of a magnetic disk drive used for storing computer information. The spindle rotates the disk whenever the disk drive is operating and during the formation of the servo patterns on the magnetically alterable surface.

The disk drive is, in turn, mounted in a fixture (also not shown) for holding it and optical system 401 and head actuator assembly 406 in a defined physical relationship to each other. The precise details of the structure of the aforementioned magnetic disk drive and the associated fixture can be understood by any person with ordinary skill in the art of designing or building magnetic disk drives and related production equipment and are therefore not shown herein. When the magnetic disk drive spins a disk 101, the previously aligned optical system 401 projects an optical image onto the optically detectable pattern 104 creating a reflected image, which is received by the photodetector of the optical system. The photodetector creates an electrical signal in proportion to the reflected image. This electrical signal is passed through wires 403. The optical system signal on wires 403 may be a continuously varying analog signal, or optionally, optical system 401 may contain signal-processing circuitry for producing a logic level signal on wires 403. Typically, once the system 401 senses the clock pattern 104, this information is used to write magnetic patterns 408 on the surface of a magnetic disk 101 using read/write head 407.

Figure 5:
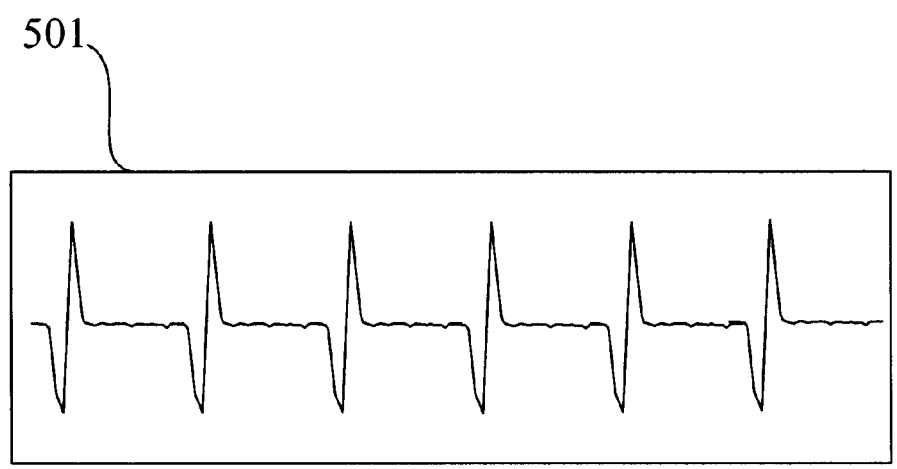
FIG. 5 represents an oscillograph of an electrical signal created by the optical sensor of FIG. 4 with the ordinate representing signal intensity and the abscissa representing time.

FIG. 5 illustrates an oscillograph of a continuously varying analog signal 501 which may be carried on wires 403 in response to disk 101 being rotated beneath an optical system 401 with said system 401 aligned over the optically detectable pattern 104. Since the physical deformation 301 composing the optically detectable pattern 104 may be formed in many differing shapes it can be appreciated that signal 501 may also take on many differing shapes.

FIG. 6 illustrates a circuit 60 for generating a magnetic pattern 408 on disk 101 in response to the electrical signal (carried by wires 403) from the optical system 401. Pattern detector 601 accepts the signal from optical system 401 on wires 403 and forms the optical system signal into a logic level signal which is then carried into clock generator 603. The construction of pattern detectors 601 and clock generators 603 are well known to those possessing ordinary skill in the art and are therefore not discussed here. Pattern detector 601 may contain circuitry for conversion of the optical system signal on wires 403 into a logic level signal if this optical system signal is not already a logic level signal. Pattern detector, 601 also may contain electronic filters for reducing extraneous noise contained in the optical system signal on wires 403. Pattern detector output signal 602 is connected to clock generator 603 which may contain a phase locked loop (PLL) circuit which may in turn contain an input divider circuit and may also contain a feedback divider circuit. This PLL circuit, contained in clock generator 603, precisely relates the frequency or phase (or both) of the optical system signal on wires 403 to the frequency or phase (or both) and timing of accurate clock signal 604. If the PLL input divider circuit in 603 is constructed to divide by any integer from 1 to N and the PLL feedback divider circuit in 603 is constructed to divide by any integer from 1 to M then the frequency of accurate clock signal 604 will conform to the frequency of the optical system signal on wires 403 multiplied by the ratio M divided by N. Therefore, the PLL circuit contained in the clock generator 603 creates an accurate clock signal 604, which conforms to one of many different frequencies with each possible frequency precisely related in frequency or phase (or both) to the optical system signal on wires 403. By also constraining the operating bandwidth of the PLL contained in clock generator 603, extraneous noise in the optical signal (on wires 403) can be significantly reduced thereby increasing the precision of accurate clock signal 604, thereby increasing the precision of the magnetic patterns to be formed on the magnetically alterable surface of disk 101.

Accurate clock signal 604 is connected to magnetic pattern generator 605 which uses accurate clock signals 604 to create a pattern signal 606. Pattern signal 606 is a logic level signal consisting of a varying pattern created by magnetic pattern generator 605 in response to accurate clock signal 604. Pattern signal 606 is connected to magnetic write circuit 607 which converts pattern signal 606 into a signal suitable for the magnetic recording head in magnetic head assembly 407. The magnetic write circuit 607 is connected to the recording head in magnetic head assembly 407 by means of wires 405. Magnetic head assembly 407 is positioned by means of head arm assembly 406 at a first radius of spinning disk 101. The magnetic recording head in magnetic head assembly 407 then creates a first accurate magnetic pattern 408 in the magnetically alterable surface of disk 101. The varying pattern created by magnetic pattern generator 605 is typically designed so that the accurate magnetic patterns formed in the magnetically alterable surface of disk 101 by the magnetic recording head in the magnetic head assembly 407 can, at a later time, be sensed by the magnetic read (playback) head of the head assembly 407 and provide timing and position information to the circuitry of the magnetic disk drive (not shown) in which the disk 101 is mounted. The head arm assembly 406 may then be moved so that magnetic head 407 is positioned at a second radius of disk 101 and second accurate magnetic pattern may be created at this second radius by means of this optical system 401, pattern detector 601, clock generator 603, magnetic pattern generator 605, magnetic write circuit 607 and the magnetic recording head in magnetic head assembly 407. Due to the precision of the frequency or phase (or both) of accurate clock signal 604 the pattern formed at this second radius will have an accurate geometric relationship to the first accurate magnetic pattern formed on the magnetically alterable surface of disk 101. Head arm assembly 406 may then be moved again so that magnetic head 407 is positioned at a third radius of disk 101 and a third accurate magnetic pattern may be created in the same manner as the first and second. In this way, a multitude of accurate patterns may be created across the entire magnetically alterable surface of the disk. Each one of these multitudes of accurate patterns will have an accurate geometric relationship to the first accurate magnetic pattern formed on the magnetically alterable surface of disk 101 and to each other.

Figure 7:
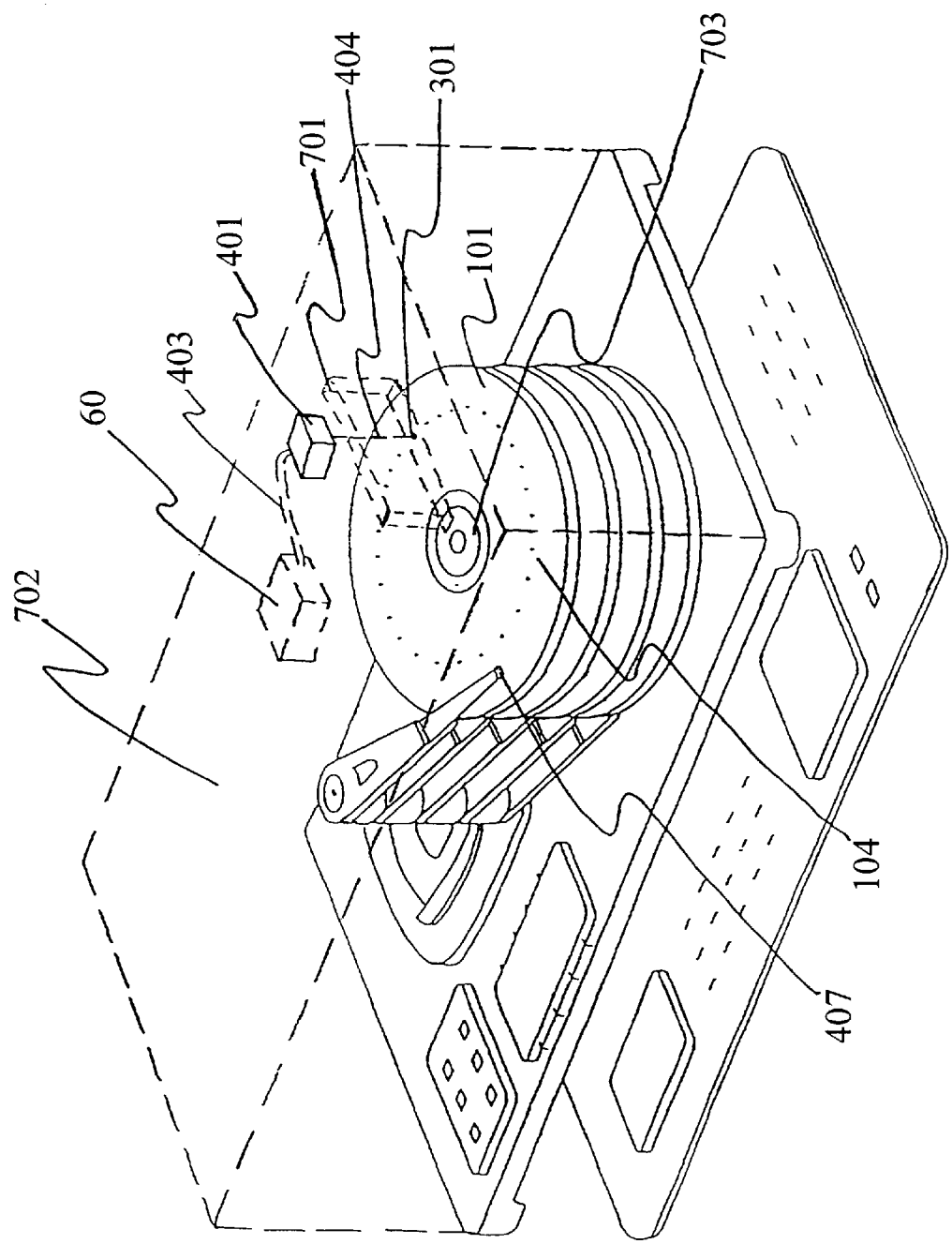
FIG. 7 is a perspective view of a disk drive, having a sealed enclosure shown in phantom.

FIG. 7 shows a disk drive having a pattern sensing apparatus which performs in accordance with the principles of the present invention. FIG. 7 shows the optical system 401 in position on a disk drive 70. The optical system 401 is shown projecting an optical beam 404 onto optically detectable features 301 of a clock pattern 104 formed on a disk 101 surface. The beam 404 is projected through a transparent window 701 in the disk drive sealed enclosure 702. The clock pattern 104 is shown formed on the disk 101, but may also be formed on the disk drive spindle 703. The dimensions of the window 701 are such that the optical system 401 may be positioned to detect a clock pattern 104 at any radius. The clock pattern of the disk is sensed by the detector of the optical system 401 and sent (through wires 403) to the pattern detecting and clock generating circuit 60 for processing which allows servo patterns to be formed using the magnetic read/write head 407 of the disk drive. The optical system 401 is moved to the appropriate radius to read clock patterns formed at said radii. Optimally, the optical system 401 is placed to read clock patterns formed at the outermost radius of a disk 101 because magnetic patterns are not usually stored at the outermost radius.

The present invention has been particularly shown and described with respect to certain preferred embodiments and features. However, it should be readily apparent to those of ordinary skill in the art that various changes and modifications in form and details may be made without departing from the spirit and scope of the invention as set forth in the appended claims. The invention disclosed herein may be practiced without elements not specifically disclosed herein. Alternative sources for reference patterns may be used as may be alternative code wheel embodiments. Additionally, the invention is intended to find usefulness forming patterns on a wide variety of data storage media.

What is claimed is:

1. A pattern forming apparatus for a disk drive, comprising:

a substantially sealed enclosure having a window;

an information storage disk mounted within the enclosure; and means positioned outside the enclosure for forming at least one accurate laser readable clock pattern on a surface of the information storage disk, the information storage disk being optically exposed to the pattern forming means through the window.

2. A pattern forming apparatus as in claim 1, further comprising:

a rotatable spindle, the information storage disk being mounted to the rotatable spindle.

3. A pattern forming apparatus as in claim 2, further comprising:

a patterned code wheel mounted to the rotatable spindle; and a sensor for detecting the code wheel pattern, the sensor further providing a signal representative of the code wheel pattern to the pattern forming means.

4. A pattern forming apparatus as in claim 1, further comprising:

a patterned code element near the data storage disk; and a sensor for detecting the code element pattern, the sensor further providing a signal representative of the code element pattern to the pattern forming means.

5. A pattern forming apparatus as in claim 1, in which the data storage disk is a magnetic storage disk.

6. A pattern forming apparatus as in claim 1, in which the forming means comprises:

an optical device configured to direct an optical beam toward the surface of the information storage disk; and means for controlling the optical device.

7. A pattern forming apparatus as in claim 1 in which the laser readable clock pattern takes the form of radially aligned rows of physical deformations.

8. A pattern forming apparatus as in claim 1 and further comprising:

an electronic circuit for controlling the pattern forming means, the electronic circuit comprising a phase locked loop circuit.

9. A pattern forming apparatus as in claim 1 in which the pattern forming means is further configured to form a textured landing zone on the surface of the information storage disk.

10. A pattern forming apparatus as in claim 1 in which the pattern forming means is further configured to form a textured surface on the surface of the information storage disk for controlling flying characteristics of a head slider as it flies over the information storage disk.

11. A method of creating an accurate clock pattern in a disk drive, the disk drive having a substantially sealed enclosure; a spindle located within the enclosure; a plurality of rotatable members mounted to the spindle assembly including one or more rotatable, data storage disks; heads for reading or writing data onto said data storage disks; and an opening in the enclosure, the method comprising a step of:

a) directing an optical beam through said opening onto a surface of one of said rotatable members so as to form a plurality of optically detectable features on said surface.

12. A method as in claim 11 wherein said optical beam is comprised of laser light.

13. A method as in claim 11 wherein said optically detectable features are patterns of physical surface deformations.

14. A method as in claim 13 wherein said patterns of physical surface deformations reduce errors in said accurate clock pattern by virtue of their size and placement.

15. A method as in claim 11, further comprising a step of:

b) rotating said rotatable members while directing step a) is being performed.

16. A method as in claim 11, in which a patterned code element is mounted within the enclosure, the directing step a) further comprising steps of:
- a1) sensing the pattern on said code element;
- a2) converting said sensed pattern into a controller electrical signal; and
- a3) controlling the optical beam with the controller optical signal such that the optical beam takes the form of optical pulses.

17. A method as in claim 11, further comprising a step of:
- b) forming a textured landing zone with the optical beam on a surface of at least one of said data storage disks.

18. A method as in claim 11, further comprising a step of:
- b) forming a textured surface with the optical beam on a surface of at least one of said data storage disks for controlling flying characteristics of a head slider as it flies over the at least one data storage disk.

* * * * *